Oct. 21, 1924.  1,512,617

P. E. McCONACHIE

FEEDING AND WATERING TROUGH FOR ANIMALS

Filed Aug. 23, 1923

P. E. McConachie, Inventor

Witnesses:

By Clarence A. O'Brien, Attorney

Patented Oct. 21, 1924.

1,512,617

UNITED STATES PATENT OFFICE.

PAUL E. McCONACHIE, OF JETMORE, KANSAS.

FEEDING AND WATERING TROUGH FOR ANIMALS.

Application filed August 23, 1923. Serial No. 658,858.

*To all whom it may concern:*

Be it known that I, PAUL E. McCONACHIE, a citizen of the United States, residing at Jetmore, in the county of Hodgeman and State of Kansas, have invented certain new and useful Improvements in Feeding and Watering Troughs for Animals, of which the following is a specification.

In carrying out the present invention it is my purpose to provide a means for the feeding and watering of animals, the device comprising essentially a pair of troughs pivotally disposed upon a base one of which is adapted to contain water and the other feed, these troughs being pivoted for allowing the same to be swung upwardly and dumped and cleaned whenever desirable.

The primary object of my invention resides in the provision of such a feeding and watering means that is extremely simple in construction and that may be manufactured and marketed at relatively small cost, the device embracing at the same time the desired features of efficiency and durability.

With the above and other objects in view as the nature of the invention is better understood the same comprises the novel form, combination and arrangement of parts set forth in the following detailed specification, shown in the accompanying drawing and claimed.

Figure 1:
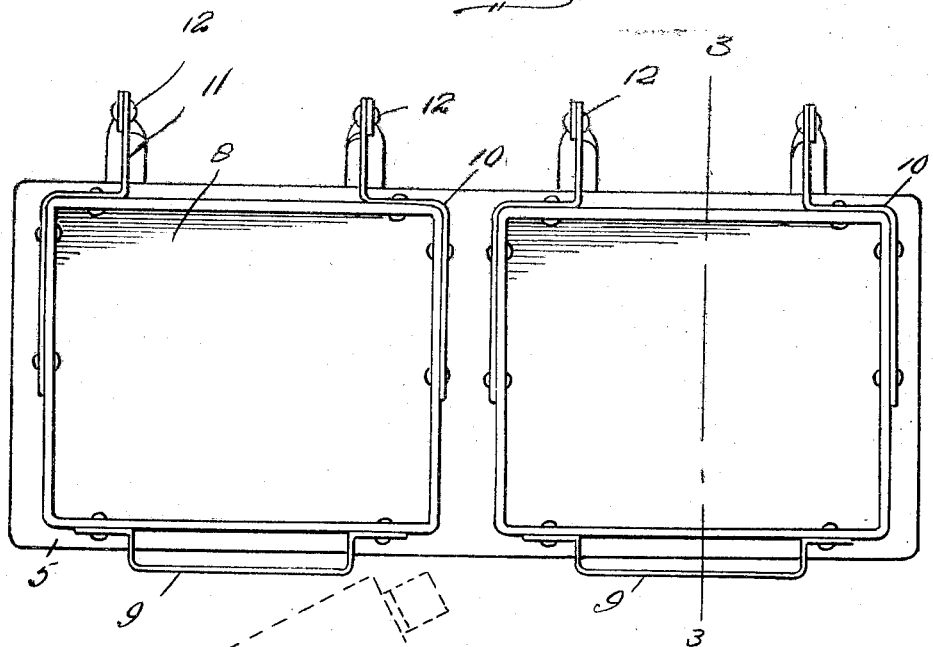
Figure 2:
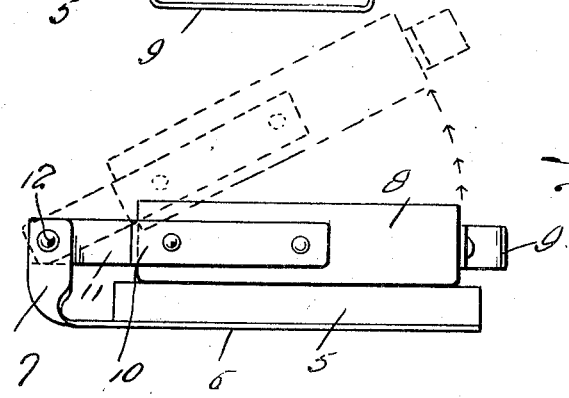
Figure 3:
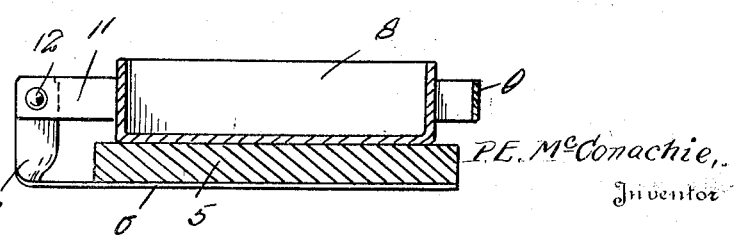

In the drawing wherein like reference characters indicate corresponding parts throughout the several views, Figure 1 is a top plan view of my improved feeding and watering troughs, Figure 2 is a side elevation thereof one of the troughs being shown in raised dotted lines position, and Figure 3 is a transverse cross section taken substantially upon the line 3—3 of Figure 1.

Now having particular reference to the drawing, 5 indicates a base that may be of any desired material and that is of a shape preferably as shown. Extending transversely beneath this base are strips of suitable metal 6 arranged in pairs as more clearly shown in Figure 1, the ends of these strips at the rear side of the base being extended upwardly for providing arms 7.

Arranged in side by side relation upon the top side of said base 5 is a pair of troughs 8 that are preferably square shaped as shown.

The construction of each of these troughs is identical and a description of one will suffice for both. At the front side of each of these troughs is a desirable form of handle 9 while secured thereto at the rear corners thereof are strips of metal 10 the ends of these strips of metal at the rear side of the trough being extended rearwardly as at 11 for providing arms that are pivotally secured at 12 to the before mentioned upstanding arms 7 of the strips of metal 6 carried by said base 5.

In view of the above description it will at once be apparent that whenever it is desired to clean or dump either one of these troughs 8 the same may be swung upwardly in the direction of the arrows, Figure 2, whereby the material therein may be discharged and even though I have set forth this feeding and watering device as constituting but a pair of troughs it is nevertheless to be understood that any desirable number of these troughs may be provided.

It is also to be understood that minor changes may be made within the invention without departing from the spirit and scope of the appended claim.

Having thus described my invention what I claim as new and desire to secure by Letters Patent, is:—

A trough structure comprising a plane base, metal strips disposed transversely of the base member and applied to the under surface thereof, said strips being provided at one end and at points spaced from the side edge of the base member with upstanding arm portions disposed in planes at right angles to the plane in which the base member lies, other strips pivotally connected at one end with the upper portions of the said arms at points above the upper surface of the base member, trough bodies attached to the last mentioned strips and adapted to rest with their bottoms upon the upper surface of the base member and adapted to be swung together with the last mentioned arms to inverted position beyond the side edge of the base member and the outer edges of the said arms.

In testimony whereof I affix my signature.

PAUL E. McCONACHIE.